United States Patent
Conrad et al.

(10) Patent No.: US 9,781,496 B2
(45) Date of Patent: Oct. 3, 2017

(54) WORKSITE AUDIO DEVICE WITH WIRELESS INTERFACE

(71) Applicant: Milwaukee Electric Tool Corporation, Brookfield, WI (US)

(72) Inventors: Cole A. Conrad, Milwaukee, WI (US); Jason R. Crowe, Seattle, WA (US); Wade F. Burch, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 570 days.

(21) Appl. No.: 14/063,869

(22) Filed: Oct. 25, 2013

(65) Prior Publication Data

US 2014/0119575 A1    May 1, 2014

Related U.S. Application Data

(60) Provisional application No. 61/718,377, filed on Oct. 25, 2012.

(51) Int. Cl.
*H04R 1/00* (2006.01)
*H02J 7/04* (2006.01)
(Continued)

(52) U.S. Cl.
CPC .............. *H04R 1/00* (2013.01); *H02J 7/0047* (2013.01); *H02J 7/045* (2013.01); *H02J 7/047* (2013.01);
(Continued)

(58) Field of Classification Search
CPC .......... H02J 7/0068; H02J 7/007; H02J 7/027; H02J 7/0004; H02J 7/0003; H02J 7/0011;
(Continued)

(56) References Cited

U.S. PATENT DOCUMENTS

| 4,835,409 A | 5/1989 | Bhagwat et al. |
| 5,603,095 A | 2/1997 | Uola |

(Continued)

FOREIGN PATENT DOCUMENTS

| EP | 2141770 | 1/2010 |
| EP | 2166614 | 3/2010 |

(Continued)

*Primary Examiner* — Davetta W Goins
*Assistant Examiner* — Jasmine Pritchard
(74) *Attorney, Agent, or Firm* — Michael Best & Friedrich LLP

(57) ABSTRACT

Systems and methods including a wireless device in communication with, controlling, and providing streaming media to a worksite audio device. The worksite audio device, such as a radio, includes a rugged structure enabling its use on construction sites. The worksite audio device is powerable via a power tool battery pack or AC source, and includes a charger circuit to charge an inserted power tool battery using power from the AC source. The worksite audio device is in communication with an external wireless device, such as a smart phone. The worksite audio device outputs to the smart phone battery status information, such as temperature and state of charge, as well as other information about the audio device. The smart phone displays the status information received from the audio device. Additionally, a user may control the audio device via a graphical user interface of the smart phone.

24 Claims, 11 Drawing Sheets

(51) Int. Cl.
*H02J 13/00* (2006.01)
*H04R 1/02* (2006.01)
*H02J 7/00* (2006.01)

(52) U.S. Cl.
CPC ......... *H02J 13/0003* (2013.01); *H02J 7/0045* (2013.01); *H02J 2007/0049* (2013.01); *H04R 1/02* (2013.01)

(58) Field of Classification Search
CPC ...... H02J 7/0014; H02J 7/0021; H02J 7/0026; H02J 7/0029; H02J 7/0031; H02J 7/0036; H02J 7/0044; H02J 7/0045; H02J 7/0047; H02J 7/0054; H02J 7/0055; H02J 7/047; H02J 7/042; H02J 7/044; H02J 7/045; H02J 2007/0095; H02J 2007/0096; H02J 2007/0098; H02J 2007/0049; H02J 2007/005; H02J 5/005
USPC ....................................................... 381/150
See application file for complete search history.

(56) References Cited

U.S. PATENT DOCUMENTS

| | | |
|---|---|---|
| 5,625,608 A | 4/1997 | Grewe et al. |
| D396,859 S | 8/1998 | Isonaga |
| 5,898,398 A | 4/1999 | Kumai |
| 5,905,438 A | 5/1999 | Weiss et al. |
| 5,909,183 A | 6/1999 | Borgstahl et al. |
| 5,991,637 A | 11/1999 | Mack, II et al. |
| D418,836 S | 1/2000 | Matt et al. |
| 6,028,764 A | 2/2000 | Richardson et al. |
| D423,451 S | 4/2000 | Heckenast et al. |
| 6,078,825 A | 6/2000 | Hahn et al. |
| 6,236,326 B1 | 5/2001 | Murphy |
| 6,255,800 B1 | 7/2001 | Bork |
| 6,308,059 B1 * | 10/2001 | Domes ................ H01M 10/46 307/151 |
| 6,366,792 B1 | 4/2002 | Katsuki |
| 6,427,070 B1 * | 7/2002 | Smith ................ H01M 2/1022 320/112 |
| 6,456,837 B1 | 9/2002 | Domes |
| D464,619 S | 10/2002 | Krieger et al. |
| D464,620 S | 10/2002 | Krieger et al. |
| D464,935 S | 10/2002 | Krieger et al. |
| 6,496,688 B2 | 12/2002 | Smith |
| 6,571,949 B2 * | 6/2003 | Burrus, IV ............ B25H 3/02 206/373 |
| 6,697,617 B2 | 2/2004 | Liebenow |
| 6,778,824 B2 | 8/2004 | Wonak et al. |
| 6,788,925 B2 | 9/2004 | Domes |
| 6,864,798 B2 | 3/2005 | Janik |
| 6,871,060 B1 | 3/2005 | Strohmeier |
| 6,876,873 B2 | 4/2005 | Suzuki |
| 6,977,481 B2 | 12/2005 | Smith |
| 6,982,541 B2 | 1/2006 | Zick et al. |
| 7,003,598 B2 | 2/2006 | Kavanagh |
| 7,010,329 B2 | 3/2006 | Livet et al. |
| 7,027,843 B2 | 4/2006 | Cromer et al. |
| D520,445 S | 5/2006 | Van Wambeke et al. |
| 7,043,283 B2 | 5/2006 | Domes |
| 7,133,703 B2 | 11/2006 | Aoshima et al. |
| D533,161 S | 12/2006 | Concari et al. |
| 7,170,035 B2 * | 1/2007 | Peterson ................ F24C 7/105 206/373 |
| 7,187,947 B1 | 3/2007 | White et al. |
| 7,190,954 B2 | 3/2007 | Wonak et al. |
| 7,194,259 B2 | 3/2007 | DeLine |
| 7,251,505 B2 | 7/2007 | Shin et al. |
| 7,277,726 B2 | 10/2007 | Ahya et al. |
| D554,583 S | 11/2007 | Solland |
| 7,332,889 B2 | 2/2008 | Glasgow et al. |
| 7,356,334 B2 | 4/2008 | Yamashita |
| 7,376,846 B2 | 5/2008 | Hawkins et al. |
| D578,551 S | 10/2008 | Bonzer |
| 7,466,974 B2 | 12/2008 | Smith |
| 7,471,063 B2 | 12/2008 | Zick et al. |
| D585,822 S | 2/2009 | Hsu |
| 7,557,537 B2 | 7/2009 | Zick et al. |
| 7,602,148 B2 | 10/2009 | Deprun |
| 7,605,742 B2 | 10/2009 | Chuang et al. |
| 7,609,027 B2 | 10/2009 | Zick et al. |
| 7,634,296 B2 | 12/2009 | Haeusel |
| 7,650,145 B2 | 1/2010 | Ukita et al. |
| D609,632 S | 2/2010 | Daniels et al. |
| D609,634 S | 2/2010 | Daniels et al. |
| D609,635 S | 2/2010 | Daniels et al. |
| 7,672,695 B1 | 3/2010 | Rainnie et al. |
| 7,675,746 B2 | 3/2010 | Crooijmans et al. |
| 7,680,490 B2 | 3/2010 | Bloebaum et al. |
| 7,685,341 B2 | 3/2010 | Steinberg et al. |
| 7,715,884 B2 | 5/2010 | Book et al. |
| 7,741,809 B2 | 6/2010 | Zick et al. |
| 7,808,205 B2 | 10/2010 | Rao et al. |
| 7,821,465 B2 | 10/2010 | Rozan |
| 7,825,626 B2 | 11/2010 | Kozisek |
| 7,835,534 B2 | 11/2010 | Cole, Jr. et al. |
| 7,852,271 B2 | 12/2010 | Grunig et al. |
| 7,862,194 B2 | 1/2011 | Seade |
| 7,868,590 B2 | 1/2011 | Zick et al. |
| 7,907,060 B2 | 3/2011 | Reams |
| 7,915,855 B2 | 3/2011 | Yoon et al. |
| D636,332 S | 4/2011 | Hsu |
| 7,929,998 B1 | 4/2011 | Edwards |
| 7,930,369 B2 | 4/2011 | Marriott et al. |
| 7,937,107 B2 | 5/2011 | Rofougaran et al. |
| 7,941,220 B2 | 5/2011 | Tobacman |
| 7,995,971 B2 | 8/2011 | Rofougaran et al. |
| 8,005,436 B2 | 8/2011 | Rofougaran et al. |
| 8,010,728 B1 | 8/2011 | Grady et al. |
| 8,032,175 B2 | 10/2011 | Rofougaran et al. |
| 8,032,189 B2 | 10/2011 | Guthrie et al. |
| 8,068,336 B2 | 11/2011 | Crooijmans et al. |
| D649,931 S | 12/2011 | James |
| 8,072,341 B2 | 12/2011 | Sheng |
| 8,080,975 B2 | 12/2011 | Bessa et al. |
| D653,203 S | 1/2012 | DuMelle et al. |
| 8,090,890 B2 | 1/2012 | Rofougaran |
| D653,612 S | 2/2012 | DuMuelle et al. |
| 8,112,032 B2 | 2/2012 | Ko et al. |
| 8,135,443 B2 | 3/2012 | Aleksic et al. |
| 8,140,129 B2 | 3/2012 | Suzuki et al. |
| 8,149,799 B2 | 4/2012 | Rofougaran |
| 8,155,367 B2 | 4/2012 | Singh |
| 8,155,592 B2 | 4/2012 | Basine |
| 8,155,636 B2 | 4/2012 | Cheng |
| 8,169,188 B2 | 5/2012 | Kogan et al. |
| 8,175,543 B2 | 5/2012 | Rofougaran et al. |
| 8,177,182 B1 | 5/2012 | Wood et al. |
| 8,199,958 B2 | 6/2012 | Weir et al. |
| 8,200,292 B2 | 6/2012 | Wu et al. |
| 8,203,307 B2 | 6/2012 | Zick et al. |
| 8,219,071 B2 | 7/2012 | Kokubo |
| 8,238,894 B2 | 8/2012 | Louch et al. |
| 8,249,650 B2 | 8/2012 | Rofougaran et al. |
| 8,265,617 B2 | 9/2012 | Lazaridis et al. |
| 8,330,665 B2 | 12/2012 | Kaikkonen et al. |
| D674,371 S | 1/2013 | Cho et al. |
| 8,344,959 B2 | 1/2013 | Autti et al. |
| 8,355,965 B2 | 1/2013 | Yamada |
| 8,390,246 B2 | 3/2013 | Taguchi et al. |
| 8,414,347 B2 | 4/2013 | Achan, Jr. et al. |
| 8,415,923 B2 * | 4/2013 | Forsythe ............ H02J 7/0008 320/110 |
| 8,449,451 B2 | 5/2013 | Dawe |
| 8,531,337 B2 | 9/2013 | Soler Castany et al. |
| RE44,557 E | 10/2013 | Domes |
| D691,983 S | 10/2013 | Vaughan et al. |
| 8,571,611 B2 | 10/2013 | Solomon |
| 8,666,524 B2 | 3/2014 | Ben-Yaacov et al. |
| D702,181 S | 4/2014 | Maki |
| D706,710 S | 6/2014 | Inskeep |
| 8,847,549 B2 | 9/2014 | Graham |

(56) References Cited

U.S. PATENT DOCUMENTS

| | | | |
|---|---|---|---|
| D723,506 S | 3/2015 | Aglassinger | |
| D726,142 S | 4/2015 | Itoh et al. | |
| 2002/0023265 A1 | 2/2002 | Metcalf | |
| 2003/0053378 A1 | 3/2003 | Lovin et al. | |
| 2003/0192061 A1 | 10/2003 | Hwangbo et al. | |
| 2004/0204168 A1 | 10/2004 | Laurila | |
| 2004/0225796 A1 | 11/2004 | Hanson et al. | |
| 2004/0242286 A1 | 12/2004 | Benco et al. | |
| 2005/0059344 A1 | 3/2005 | Chang | |
| 2005/0060238 A1 | 3/2005 | Gravina et al. | |
| 2005/0078834 A1 | 4/2005 | Hirschburger et al. | |
| 2005/0083639 A1* | 4/2005 | Zick | H01M 2/1016 361/600 |
| 2005/0107131 A1 | 5/2005 | Abramov | |
| 2005/0156564 A1* | 7/2005 | Krieger | H01M 2/1022 320/112 |
| 2005/0225288 A1 | 10/2005 | Cole, Jr. et al. | |
| 2006/0046656 A1 | 3/2006 | Yang | |
| 2006/0135218 A1 | 6/2006 | Son et al. | |
| 2006/0158608 A1 | 7/2006 | Lin | |
| 2006/0206582 A1 | 9/2006 | Finn | |
| 2007/0055743 A1 | 3/2007 | Pirtle et al. | |
| 2007/0096691 A1 | 5/2007 | Duncan et al. | |
| 2007/0257808 A1 | 11/2007 | Lin | |
| 2007/0291973 A1 | 12/2007 | Neu et al. | |
| 2008/0007431 A1 | 1/2008 | Jacques | |
| 2008/0045202 A1 | 2/2008 | Chan et al. | |
| 2008/0075295 A1 | 3/2008 | Mayman et al. | |
| 2008/0100261 A1 | 5/2008 | Glasgow et al. | |
| 2008/0109734 A1 | 5/2008 | Castagno | |
| 2008/0112573 A1 | 5/2008 | Huang | |
| 2008/0212073 A1 | 9/2008 | Ehring | |
| 2008/0232522 A1 | 9/2008 | Rofougaran et al. | |
| 2008/0268912 A1 | 10/2008 | Wang | |
| 2008/0268917 A1 | 10/2008 | Chang et al. | |
| 2008/0309285 A1* | 12/2008 | Choksi | B25F 5/00 320/106 |
| 2008/0311954 A1 | 12/2008 | Tsai et al. | |
| 2008/0318642 A1 | 12/2008 | Tanaka | |
| 2009/0023389 A1 | 1/2009 | Paryani | |
| 2009/0066529 A1 | 3/2009 | Fukada | |
| 2009/0098914 A1 | 4/2009 | Martin-Cocher et al. | |
| 2009/0128090 A1 | 5/2009 | Bi | |
| 2009/0197640 A1* | 8/2009 | Fa | H04M 1/6066 455/556.1 |
| 2009/0240502 A1 | 9/2009 | Kemplin | |
| 2009/0290745 A1 | 11/2009 | Weir et al. | |
| 2009/0319063 A1 | 12/2009 | Pan | |
| 2009/0322277 A1* | 12/2009 | Cargin, Jr. | G06F 1/1613 320/106 |
| 2010/0102065 A1 | 4/2010 | Phelan | |
| 2010/0174390 A1 | 7/2010 | Garrett et al. | |
| 2010/0177598 A1 | 7/2010 | Zhang et al. | |
| 2010/0181964 A1 | 7/2010 | Huggins et al. | |
| 2010/0194667 A1 | 8/2010 | Lee et al. | |
| 2010/0211643 A1* | 8/2010 | Lowenthal | B60L 3/0069 709/206 |
| 2010/0279734 A1 | 11/2010 | Karkinen et al. | |
| 2010/0281287 A1 | 11/2010 | Doerksen et al. | |
| 2010/0283624 A1 | 11/2010 | Krueger | |
| 2010/0297941 A1 | 11/2010 | Doan et al. | |
| 2010/0302980 A1 | 12/2010 | Ji et al. | |
| 2011/0050478 A1 | 3/2011 | Choi et al. | |
| 2011/0068742 A1 | 3/2011 | McCurry et al. | |
| 2011/0081875 A1 | 4/2011 | Imamura et al. | |
| 2011/0090726 A1* | 4/2011 | Brotto | H02J 7/0065 363/131 |
| 2011/0099157 A1 | 4/2011 | Lebeau et al. | |
| 2011/0128007 A1 | 6/2011 | Nishidai et al. | |
| 2011/0138317 A1 | 6/2011 | Kang et al. | |
| 2011/0254692 A1 | 10/2011 | Furuta | |
| 2011/0285570 A1 | 11/2011 | Shirai et al. | |
| 2011/0304443 A1 | 12/2011 | Sheridan et al. | |
| 2011/0313697 A1 | 12/2011 | Staton et al. | |
| 2011/0316664 A1 | 12/2011 | Olcott et al. | |
| 2012/0021808 A1 | 1/2012 | Tseng | |
| 2012/0025957 A1 | 2/2012 | Yang | |
| 2012/0033140 A1 | 2/2012 | Xu | |
| 2012/0043937 A1 | 2/2012 | Williams | |
| 2012/0115549 A1 | 5/2012 | Kim et al. | |
| 2012/0131364 A1 | 5/2012 | Gromat et al. | |
| 2012/0174165 A1 | 7/2012 | Mondragon et al. | |
| 2012/0187851 A1 | 7/2012 | Huggins et al. | |
| 2012/0208481 A1 | 8/2012 | Bose | |
| 2012/0217971 A1 | 8/2012 | Deluca | |
| 2012/0224698 A1 | 9/2012 | Yang | |
| 2012/0235628 A1* | 9/2012 | Okabayashi | H02J 7/00 320/106 |
| 2012/0249384 A1 | 10/2012 | Kaikkinen et al. | |
| 2012/0280867 A1 | 11/2012 | Baek et al. | |
| 2012/0297960 A1 | 11/2012 | Bader | |
| 2012/0302288 A1 | 11/2012 | Born et al. | |
| 2012/0303851 A1 | 11/2012 | Tseng et al. | |
| 2013/0054399 A1 | 2/2013 | Ben-Yacov et al. | |
| 2013/0109375 A1* | 5/2013 | Zeiler | H04W 4/028 455/426.1 |
| 2013/0120221 A1 | 5/2013 | Lindberg et al. | |
| 2013/0196721 A1 | 8/2013 | Waterman et al. | |
| 2013/0198867 A1 | 8/2013 | Ricci et al. | |
| 2013/0201078 A1 | 8/2013 | Russello | |
| 2013/0207598 A1 | 8/2013 | Teltz et al. | |
| 2013/0208417 A1 | 8/2013 | Sirpal | |
| 2013/0210489 A1 | 8/2013 | Jouin | |
| 2013/0210494 A1 | 8/2013 | Jouin | |
| 2013/0225033 A1 | 8/2013 | Achan, Jr. | |
| 2013/0273832 A1 | 10/2013 | Coleman | |
| 2013/0273970 A1 | 10/2013 | Selim | |
| 2013/0282956 A1 | 10/2013 | Ramdeo | |
| 2013/0297844 A1 | 11/2013 | Rosenberg et al. | |
| 2013/0335014 A1* | 12/2013 | Ashinghurst | H02J 7/0042 320/108 |
| 2014/0003617 A1 | 1/2014 | Wang et al. | |
| 2014/0008992 A1 | 1/2014 | Leabman | |
| 2014/0008993 A1 | 1/2014 | Leabman | |
| 2014/0009108 A1 | 1/2014 | Leabman | |
| 2014/0059263 A1 | 2/2014 | Rosenberg et al. | |
| 2014/0073250 A1 | 3/2014 | Singh | |
| 2014/0107853 A1* | 4/2014 | Ashinghurst | G05B 19/048 700/297 |
| 2014/0119575 A1 | 5/2014 | Conrad et al. | |
| 2014/0151079 A1 | 6/2014 | Furui et al. | |
| 2014/0192480 A1 | 7/2014 | Winkler et al. | |
| 2014/0207635 A1* | 7/2014 | Pappas | G06Q 10/109 705/32 |
| 2014/0240125 A1* | 8/2014 | Burch | G08B 21/0213 340/539.13 |
| 2014/0295758 A1 | 10/2014 | Pedersen | |
| 2015/0015192 A1 | 1/2015 | Leabman et al. | |
| 2015/0022008 A1 | 1/2015 | Leabman et al. | |
| 2015/0134869 A1 | 5/2015 | Graham | |

FOREIGN PATENT DOCUMENTS

| | | |
|---|---|---|
| EP | 2182577 | 5/2010 |
| EP | 2209160 | 7/2010 |
| EP | 2219265 | 8/2010 |
| WO | 2006079254 | 8/2006 |
| WO | 2007060547 | 5/2007 |
| WO | 2008041942 | 4/2008 |
| WO | 2009043005 | 4/2009 |
| WO | 2010132399 | 11/2010 |
| WO | WO 2012071607 | 6/2012 |
| WO | 2013173898 | 11/2013 |

* cited by examiner

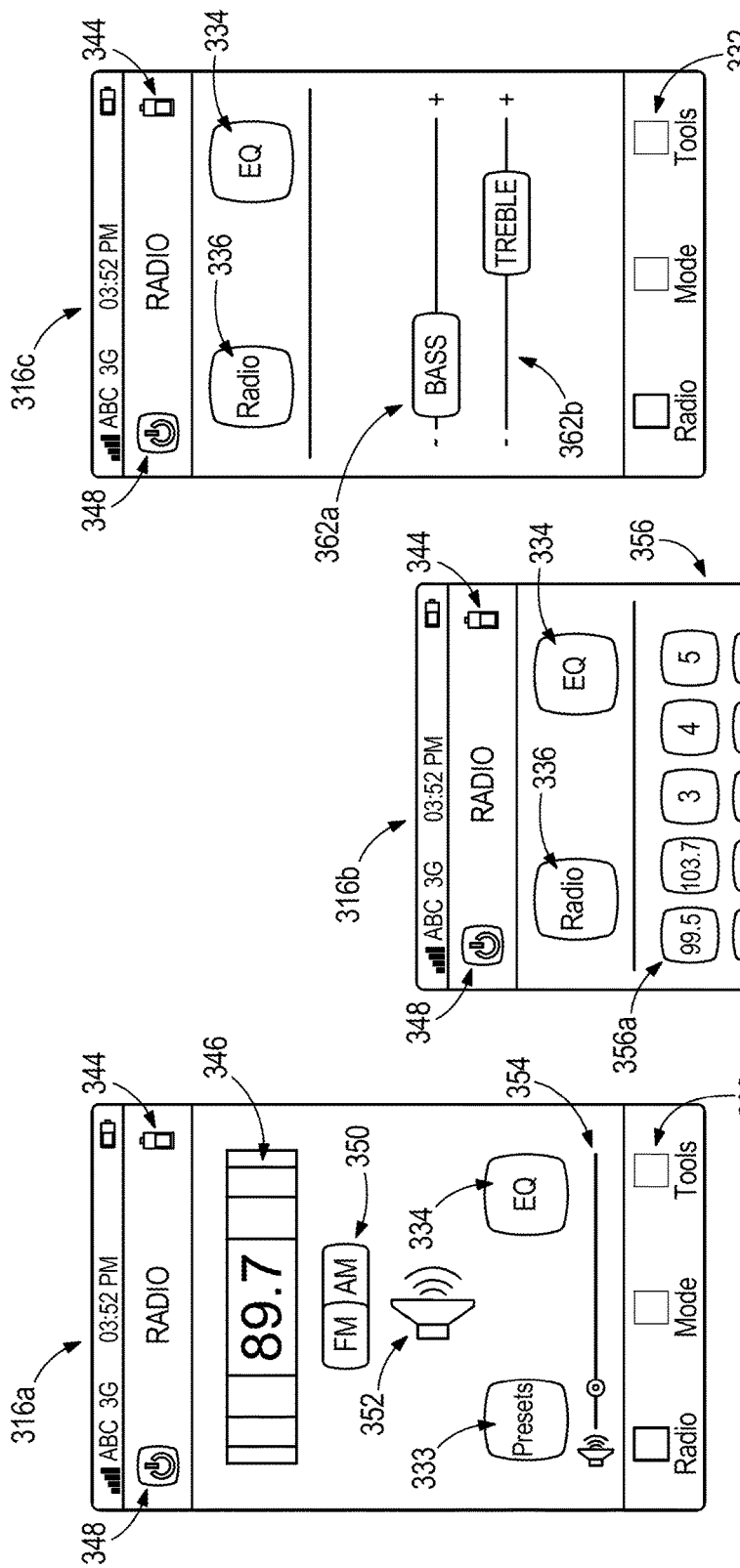

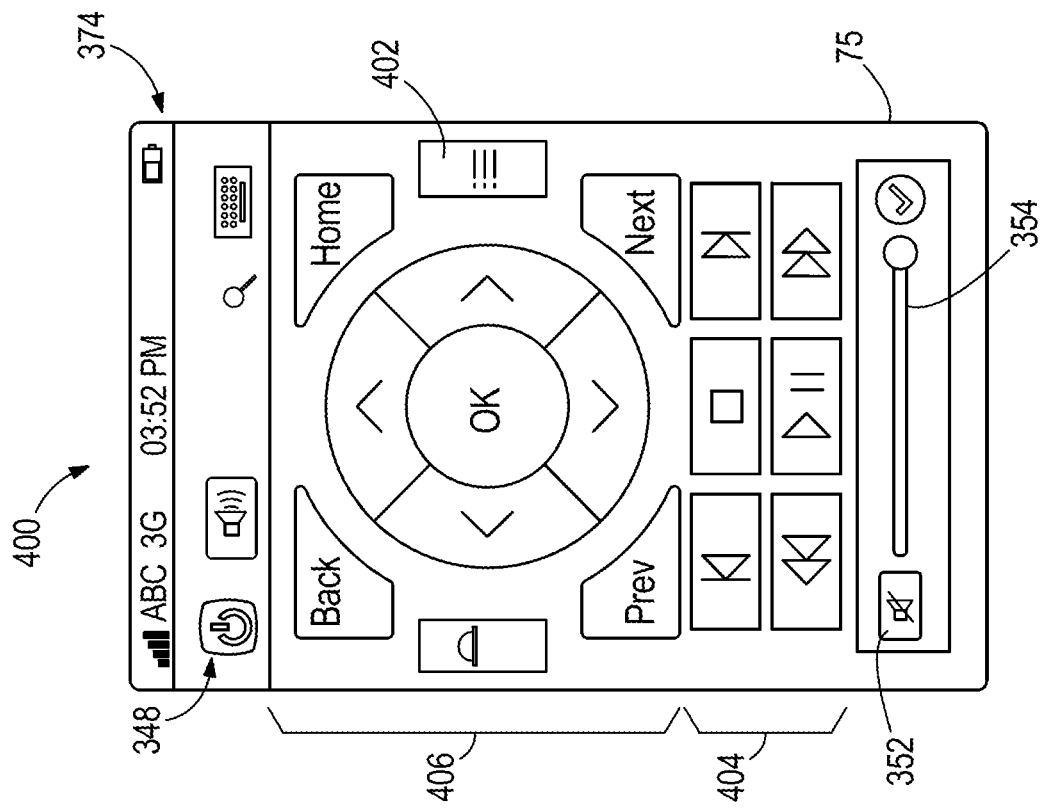

WORKSITE AUDIO DEVICE WITH WIRELESS INTERFACE

CROSS-REFERENCE TO RELATED APPLICATIONS

The application claims priority to U.S. Provisional Patent Application No. 61/718,377, filed Oct. 25, 2012, the entire contents of which are incorporated herein by reference.

FIELD OF THE INVENTION

The present invention relates to worksite audio devices, including worksite radios.

SUMMARY OF THE INVENTION

A worksite audio device, such as a radio, includes a rugged construction such that dropping, bumping, jostling, vibration, and other impacts against a housing of the radio that may typically occur on a worksite (e.g., construction site), do not damage the worksite audio device. Additionally, the worksite radio may include barriers, seals, and other elements to prevent dust, water, and other contaminants from infiltrating the housing and damaging internal components, such as audio and power circuitry.

In one embodiment, the invention provides a worksite audio device. The worksite audio device includes a battery receptacle that receives a power tool battery pack, a battery charging circuit that charges the power tool battery pack in the battery receptacle, and an audio circuit coupled to a speaker and that provides an audio signal to a speaker, wherein the speaker outputs audio corresponding to the provided audio signals. The worksite audio device further includes a battery monitoring module that determines a status of the power tool battery pack in the battery receptacle, a wireless interface that wirelessly communicates with an external device having a display, and a controller coupled to the battery monitoring module and the wireless interface. The controller receives the status of the power tool battery pack from the battery monitoring module, and outputs, via the wireless interface, the status of the power tool battery pack to the external device for display.

In one embodiment, the invention provides a worksite audio device control system including a worksite audio device and a mobile phone. The worksite audio device includes a battery receptacle that receives a power tool battery pack, a battery charging circuit that charges the power tool battery pack in the battery receptacle, and an audio circuit coupled to a speaker and that provides audio signals to a speaker, wherein the speaker outputs audio corresponding to the provided audio signals. The worksite audio device further includes a battery monitoring module that determines a status of the power tool battery pack in the battery receptacle; a first wireless interface; and a controller coupled to the battery monitoring module and the first wireless interface. The controller receives the status of the power tool battery pack from the battery monitoring module, and outputs, via the first wireless interface, the status of the power tool battery pack. The mobile phone includes a second wireless interface, a display, and a phone controller coupled to the second wireless interface and the display. The phone controller receives the status of the power tool battery pack from the controller of the worksite audio device via the second wireless interface, and causes the status of the power tool battery pack to be shown on the display.

In another embodiment the invention provides a method of wirelessly communicating by an audio device. The audio device includes a battery receptacle that receives a power tool battery pack, a battery charging circuit that charges the power tool battery pack in the battery receptacle, an audio circuit coupled to a speaker, a battery monitoring module that determines a status of the power tool battery pack in the battery receptacle, a wireless interface that wirelessly communicates with an external device having a display, and a controller coupled to the battery monitoring module and the wireless interface. The method includes establishing a wireless connection, via the wireless interface, with the external device, and obtaining the status of the power tool battery pack from the battery monitoring module. The status of the power tool battery pack is output, via the wireless interface, to the external device. A command is received from the external device, via the wireless interface, and the audio device is controlled in accordance with the command.

Other aspects of the invention will become apparent by consideration of the detailed description and accompanying drawings.

BRIEF DESCRIPTION OF THE DRAWINGS

FIG. 4A-H illustrate screen shots of a graphical user interface of a wireless device in communication with an audio device.

FIG. 5 illustrates another graphical user interface of a wireless device.

DETAILED DESCRIPTION

Figure 1:
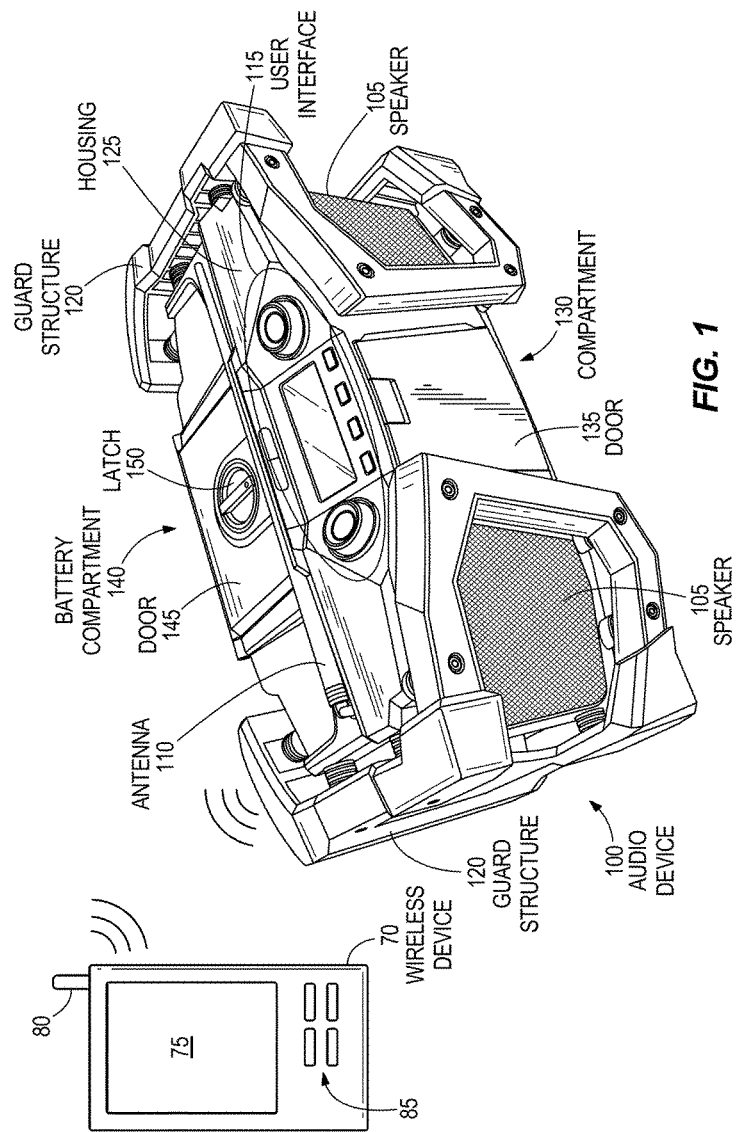
FIG. 1 illustrates a wireless device and audio device in wireless communication in accordance with embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

FIG. 1 illustrates a wireless device 70 and a worksite audio device 100 according to embodiments of the invention. The wireless device 70 includes a touch screen display 75, an antenna 80, and additional user inputs 85. The wireless device 70 may be, for example, a smart phone, multi-media player, laptop computer, personal computer, tablet, or similar device having wireless communication abilities. The wireless device 70 is in bidirectional, wireless communication with an audio device 100, as will be further described below.

The audio device 100 includes speakers 105, an antenna 110, and a user audio interface 115. The user audio interface 115 includes a display screen, volume dial, tuning dial, and actuators to enable a user to control the audio device 100. The actuators enable a user to, for example, assign and select preset radio stations, change between AM and FM radio frequencies, cause audio media to play, pause, stop, skip forward, skip backward, fast forward, or rewind. In some embodiments, a touch screen display is used in place of or in addition to various components of the user interface 115. The antenna 110 is a radio antenna for receiving AM and FM radio signals.

The audio device 100 further includes guard structures 120 to provide impact resistance such that dropping, bumping, jostling, vibration, and other impacts against a housing 125 of the audio device 100 that may typically occur on a worksite (e.g., construction site), do not damage the audio device 100. Additionally, the worksite radio 100 may include barriers and other elements (generally not shown) to prevent dust, water, and other contaminants from infiltrating the housing 125 and damaging internal components, such as audio and power circuitry.

The housing 125 includes an audio compartment 130 covered by a door 135 that pivots near the base of the housing 125 and latches near the user interface 115 of the housing. The audio compartment 130 may include an auxiliary input (e.g., a ⅛ or ¼ inch jack) such that an external device may provide an analog audio stream for play by the audio device 100. The audio compartment 130 may further include a data port, such as a Universal Serial Bus (USB)® port or other port, that enables digital communications with the audio device 100 and provides charge to devices coupled thereto, such as mobile phone, digital audio players, etc. In some embodiments, the data port provides a communication link that enables the audio device 100 to obtain data from a device coupled thereto for display on the user interface 115 and to control the device via the user interface 115.

The housing also includes battery compartment 140 covered by door 145, which is secured shut via a rotating latching mechanism 150. Within the battery compartment 140 is a power tool battery interface for selectively receiving a power tool battery. When connected, the power tool battery is operable to provide power to the audio device 100. Additionally, if the audio device 100 is coupled to an AC power source via an AC power cord (not shown), the audio device 100 is operable to charge the power tool battery.

Figure 2:
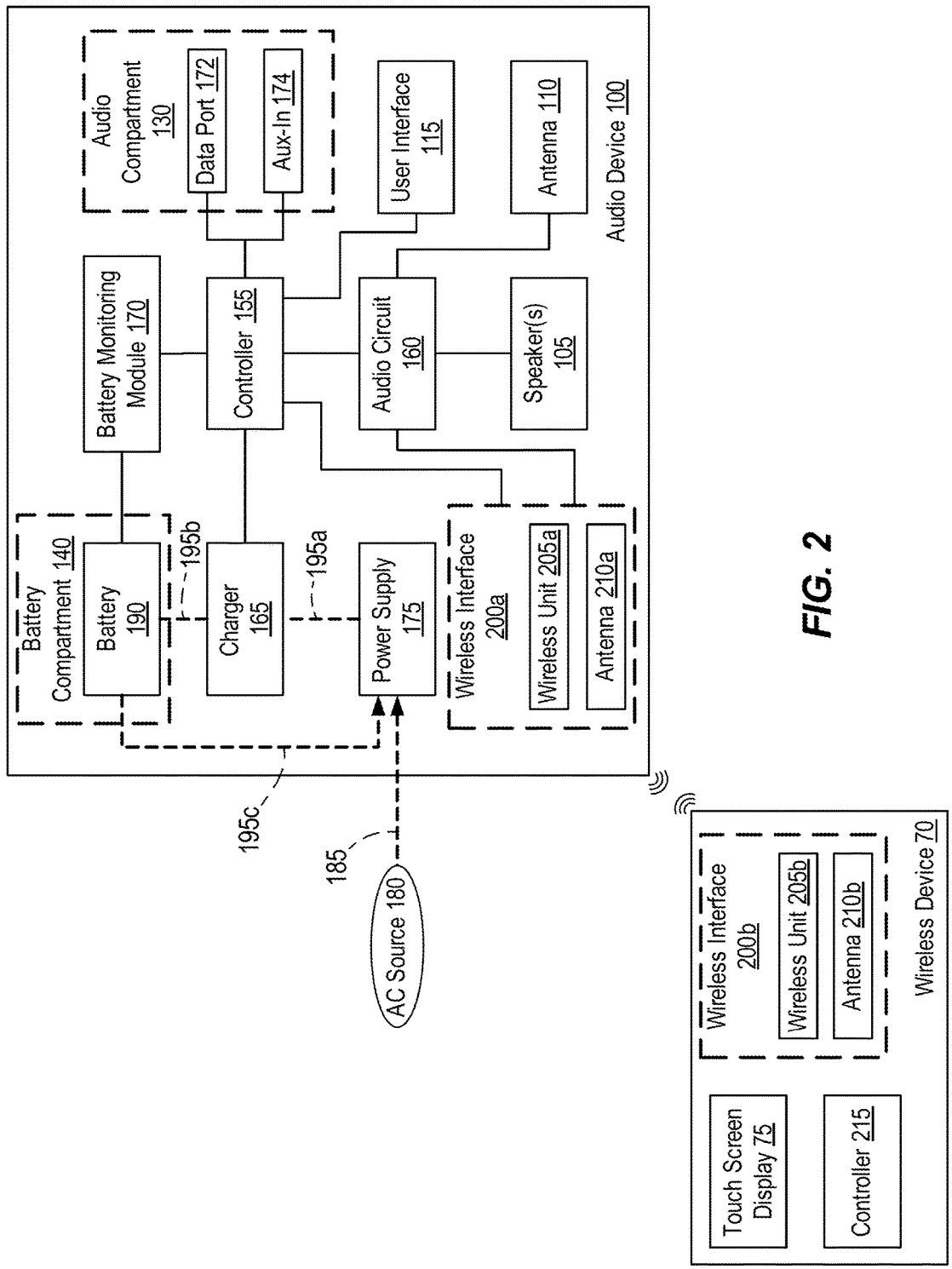
FIG. 2 depicts a block diagram of a wireless device and audio device in wireless communication in accordance with embodiments of the invention.

FIG. 2 illustrates a block diagram of the wireless device 70 and the audio device 100. As illustrated, the audio device 100 includes a controller 155 operable to receive input from various components of the audio device 100 and to control various components of the audio device 100 based on this input. The controller 155 is coupled to the user interface 115, an audio circuit 160, a charger 165, a battery monitoring module 170, a data port 172, and an auxiliary input 174. The audio device 100 further includes a power supply 175 selectively coupled to an AC source 180 via an AC power cord 185 and to a power tool battery 190 removably inserted into the battery compartment 140. The power supply 175 receives power from the AC power source 180 or power tool battery 190, depending on which is presently coupled to the audio device 100. If both the power supply 175 and power tool battery 190 are coupled to the audio device 100, the power supply 175 receives power from the AC source 180. The power supply 175 conditions, converts, and filters received power to levels appropriate for supply to the various components of the audio device 100. With the exception of the power lines 185, 195a 195b, and 195c (shown in dashed line) connecting the power supply 175, the charger 165, and the battery 190, the power lines from the power supply 175 to other components are not illustrated in FIG. 2. The charger 165 is operable to charge the battery 190, as needed, using power provided the AC source 180 via the power supply 175.

The battery monitoring module 170 monitors the state of charge and temperature of the battery 190. For instance, the battery monitoring module 170 may include a voltage sensor to determine the voltage of the battery 190 to infer its state of charge, and may also include a temperature sensor positioned near by the battery 190 to gauge its temperature. In some embodiments, the battery monitoring module 170 also monitors rates of change of the state of charge and temperature, as well as other battery characteristics. In some embodiments, the battery 190 detects its own state of charge and/or temperature. In turn, the battery 190 outputs the detected state of charge and/or temperature to the battery monitoring module 170 via a data terminal. The battery 190 may further detect and output other battery characteristics to the battery monitoring module 170. The battery monitoring module 170 provides the monitored battery data to the controller 155. The controller 155, in turn, controls the charger 165 based on the charge level and temperature determined by the battery monitoring module 170. Additionally, in response to a low battery charge signal from the battery monitoring module 170, the controller 155 will shut down the audio device 100 or otherwise prevent receipt of power from the battery 190, which could harm or shorten the life of the battery 190.

The battery state of charge and other battery status information obtained by the battery monitoring module 170 may be provided to the controller 155 for display on the user interface 115 of the audio device 100. The state of charge may be shown graphically (see, e.g., battery level 344 in FIG. 4G).

The audio circuit 160 obtains an audio signal, such as from the auxiliary input 174 or antenna 110, and provides the audio signal to the speakers 105 for output. In some instances, the audio circuit 160 includes filters, equalizers, etc. to modify the audio signal before sending to the speakers 105. The audio circuit 160 determines which audio signal to output based on an audio select signal from the controller 155. The controller 155 generates the audio select signal based on inputs from the user interface 115 or wireless device 70. Additionally, the controller 155 may detect a newly connected audio input (e.g., via auxiliary input 174), and automatically send an audio select signal to the audio circuit 160 such that the audio circuit 160 begins sending the audio signal from the auxiliary input 174 to the speakers 105.

The audio device 100 further includes a wireless interface module 200*a*. The wireless interface module 200*a* includes a wireless unit 205*a* and an antenna 210*a*. In some embodiments, the wireless unit 205*a* is integrated into the controller 155. The wireless interface module 200*a* enables the audio device 100 to communicate with the wireless device 70 wirelessly. The wireless unit 205*a* receives data to be output from the controller 155. The wireless unit 205*a* converts the received data in accordance with a particular communication protocol and outputs the converted data via the antenna 210*a* to the wireless device 70.

The wireless device 70 includes a wireless interface module 200*b* and a controller 215. The wireless interface module 200*b* includes wireless unit 205*b* and an antenna 210*b*, which may be the same antenna as antenna 80 of FIG. 1 or a separate antenna. In some embodiments, the wireless unit 205*b* is integrated into the controller 215. The wireless interface module 200*b* enables the wireless device 70 to communicate with the audio device 100. As illustrated, the wireless interfaces 200*a* and 200*b* have similar components and functionality. In some embodiments, the wireless interface 200*b* and the wireless interface 200*a* may have distinct components, but are still operable to wirelessly communicate with each other. The wireless interface modules 200*a* and 200*b* may communicate according to one or more wireless communication protocols, such as Bluetooth®, WiFi® (e.g., IEEE 802.11), etc. In some instances, the wireless interfaces 200*a* and/or 200*b* communicate via analog transmission protocols.

The controller 215 is operable to receive input from various components of the wireless device (e.g., the touch screen display 75 and the wireless interface 200*b*) and to control various components of the audio device 100 based on this input. Furthermore, the controller 215 is operable to request and receive user input via the touch screen display 75 for controlling the audio device 100. For instance, the controller 215 may cause the display of a virtual user interface on the touch screen display 75, the virtual user interface replicating the user interface 115. The user may then interact with the touch screen display 75 similar to how he or she would the actual user interface 115 to control the audio device 100. In some embodiments, the virtual user interface does not replicate the user interface 115, but still provides similar functionality and control opportunities for the user.

The wireless device 70 further includes a media module 220 having a memory 225 storing digital media, such as audio, video, and text files. The media module 220 is operable to generate a digital media stream for supply to the wireless interface 200*b*, either directly or via the controller 215, for output to the audio device 100. In the case of an audio file, the wireless device 200*a* provides the audio stream to the audio circuit 160, either directly or via the controller 155, for output to the speakers 105. Accordingly, the audio device 100 is operable to output streamed music and other audio files stored in the wireless device 70. In the case of a text file, the controller 155 is operable to display the text of the text file on a display of the user interface 115. In the case of a video file, the controller 155 is operable to display the visual portions of the video on a display of the user interface 115, while the audio circuit 160 outputs the audio portions of the video to the speakers 105.

The media module 220 is further operable to obtain digital media from other sources for supply to and output by the audio device. For example, the wireless device 70 is operable to communicate with a remote server (not shown), e.g., via a cellular data network or WiFi® connection, to obtain remotely stored digital media. For instance, one or more software applications executed on the wireless device 70 (e.g., a smart phone) allow streaming of video or audio from remote sources to the wireless device 70. The wireless device 70 is then operable to forward digital media obtained from the remote source to the audio device 100 for output.

In some embodiments, the audio device 100 includes a media memory (not shown) for storage of digital media, such as audio, text, and/video files. The controller 155 is operable to obtain digital media and, in conjunction with the audio circuit 160 and/or user interface 115, play or display the selected digital media. Using the wireless interfaces 200*a* and 200*b*, the controller 215 is operable to obtain a list of the digital media stored on the audio device 100. The digital media obtained is then displayed on the touch screen display 75. A user then selects the digital media for play or display via the touch screen display 75 of the wireless device 70 and user interface 115.

In some embodiments, the audio device 100 is able to stream media to the wireless device 70. For instance, the audio device 100 obtains an AM or FM radio signal via the antenna 110 and provides the signal to the controller 155 or audio circuit 160. The controller 155 or audio circuit 160 forwards the radio signal to the wireless interface 200*a*, which outputs the radio signal to the wireless interface 200*b* of the wireless device 70. Accordingly, the wireless device 70 is able to output via a speaker (not shown) or record the audio of the radio signal obtained and forwarded by the audio device 100.

Figure 3:
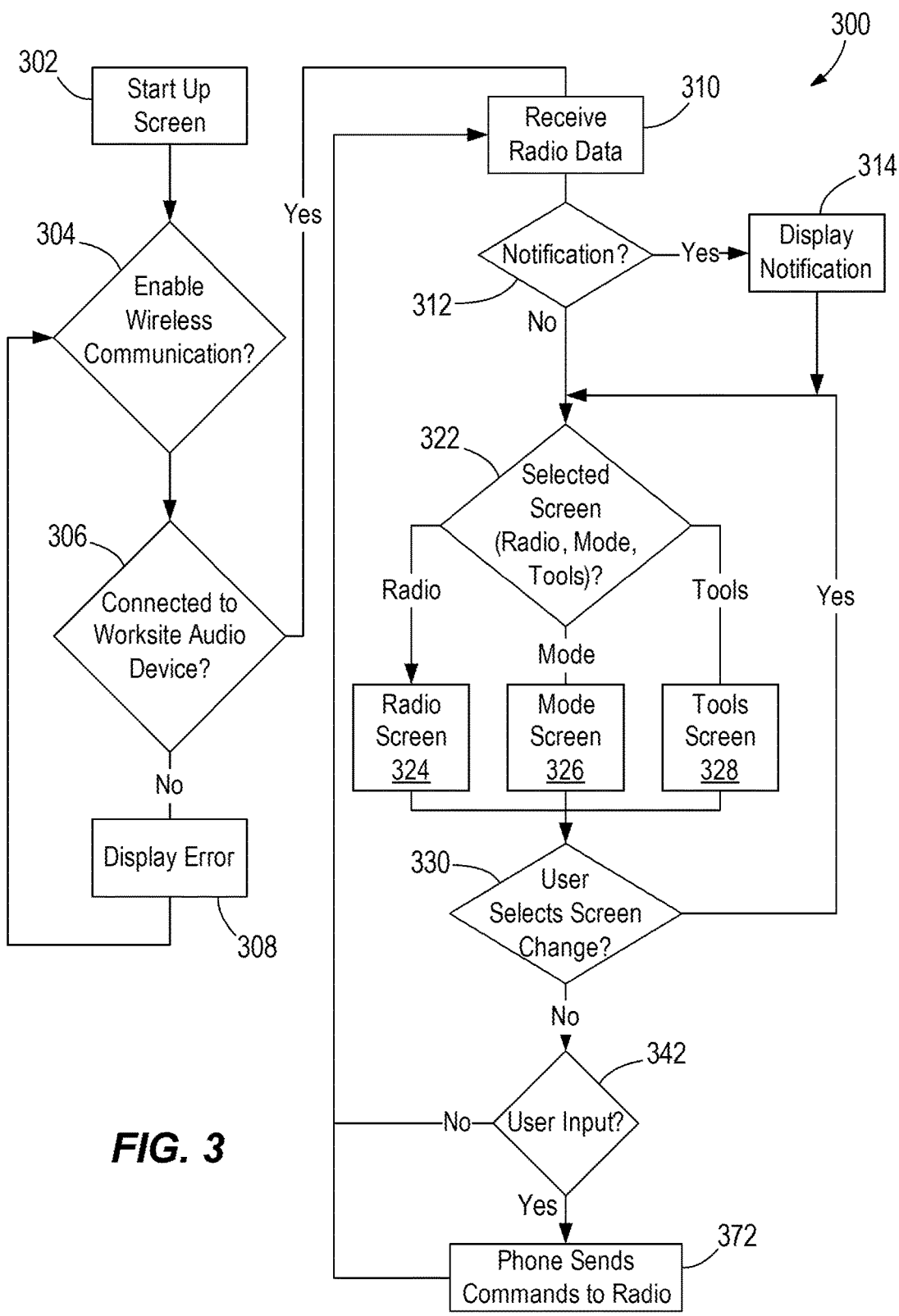
FIG. 3 illustrates a wireless communication method for a wireless device and audio device.
Figure 4A:
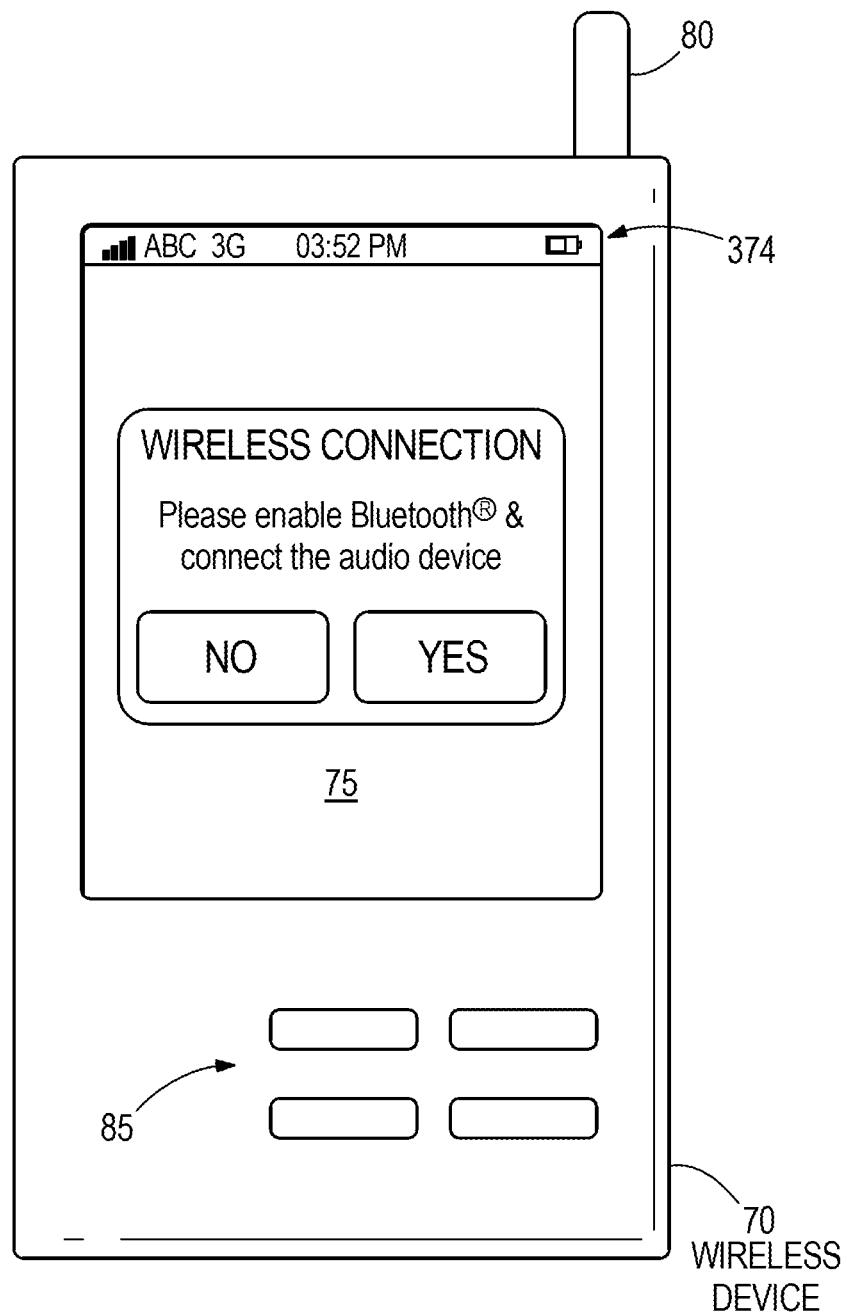

A method 300 of operation of the wireless device 70 and audio device 100 is illustrated in FIG. 3. The method 300 is described with reference to exemplary graphical user interface (GUI) screens in FIGS. 4A-H. In step 302, the wireless device 70 launches a software application, for example, in response to a user input on the touch screen display 75, and a start up screen is shown on the display 75. The application may include instructions stored on the wireless device 70 or obtained by the wireless device 70 in real time from a remote server, in part or in whole, and executed by the controller 215. After a predetermined amount of time, e.g., five seconds, the controller 215 proceeds to step 304 and presents the user with an option of whether to enable a wireless communication with the audio device 100. For example, a wireless connection screen is illustrated in FIG. 4A whereby the user may select to enable or not enable the wireless device 70 to form a Bluetooth® connection with the audio device 100. In some instances, selecting to enable the wireless device 70 to form a wireless connection causes the wireless device 70 to exit the application, at least temporarily, to enter a separate settings application wherein the user is able to enable the wireless communication functionality of the wireless device 70. In some instances, the wireless device 70 automatically attempts to form a wireless connection with the audio device 100 upon start-up of the application. Step 304 may be bypassed when, during step 302, the software application determines that the user has previously enabled wireless communication on the wireless device 70 and connected to the audio device 100.

If the user selects no, the controller 215 may exit the application or proceed to a restricted version of the application with aspects disable that require wireless communication. Once wireless communication is enabled, the wireless device 70 attempts to form a wireless connection with the audio device 100. In some instance, a user is able to selectively enable the wireless communication capability of the audio device 100 (e.g., via the user interface 115) such that the audio device 100 can be placed into (a) a standby mode where the audio device 100 is listening for a communication from a wireless device 70 and (b) a deactivated mode where the audio device 100 is not listening for wireless communications from the wireless device 70. By placing the audio device 100 in the deactivated mode, the wireless interface 200*a* may be disabled and power consumed by the audio device 100 may be reduced. To form the connection, the wireless device 70 and audio device 100 may have a handshaking protocol or set of communications to ensure a valid connection is present. Additionally, the connection may include a secure connection, such as an encoded, encrypted, and/or password-protected connection. To allow for the secure connection, the user may enter into the application at start-up or the password may be saved to avoid re-entering the password at each start-up. In step 306, the controller 215 determines whether the wireless device 70 has been connected to the audio device 100. If not, the controller 215 displays an error in step 308 and returns to step 304 or exits the application.

In step 310, the audio device 100 outputs data to the wireless device 70. The data may include battery data (e.g., state of charge and/or temperature), audio device status data (e.g., preset stations, current station and band, current bass, treble, and other equalizer settings, volume data, etc.) firmware version, and/or clock information (e.g., current time and date stored on the audio device 100). The data may be output in response to a request from the wireless device 70 or the data may be output by the audio device 100 automatically.

Figure 4B:
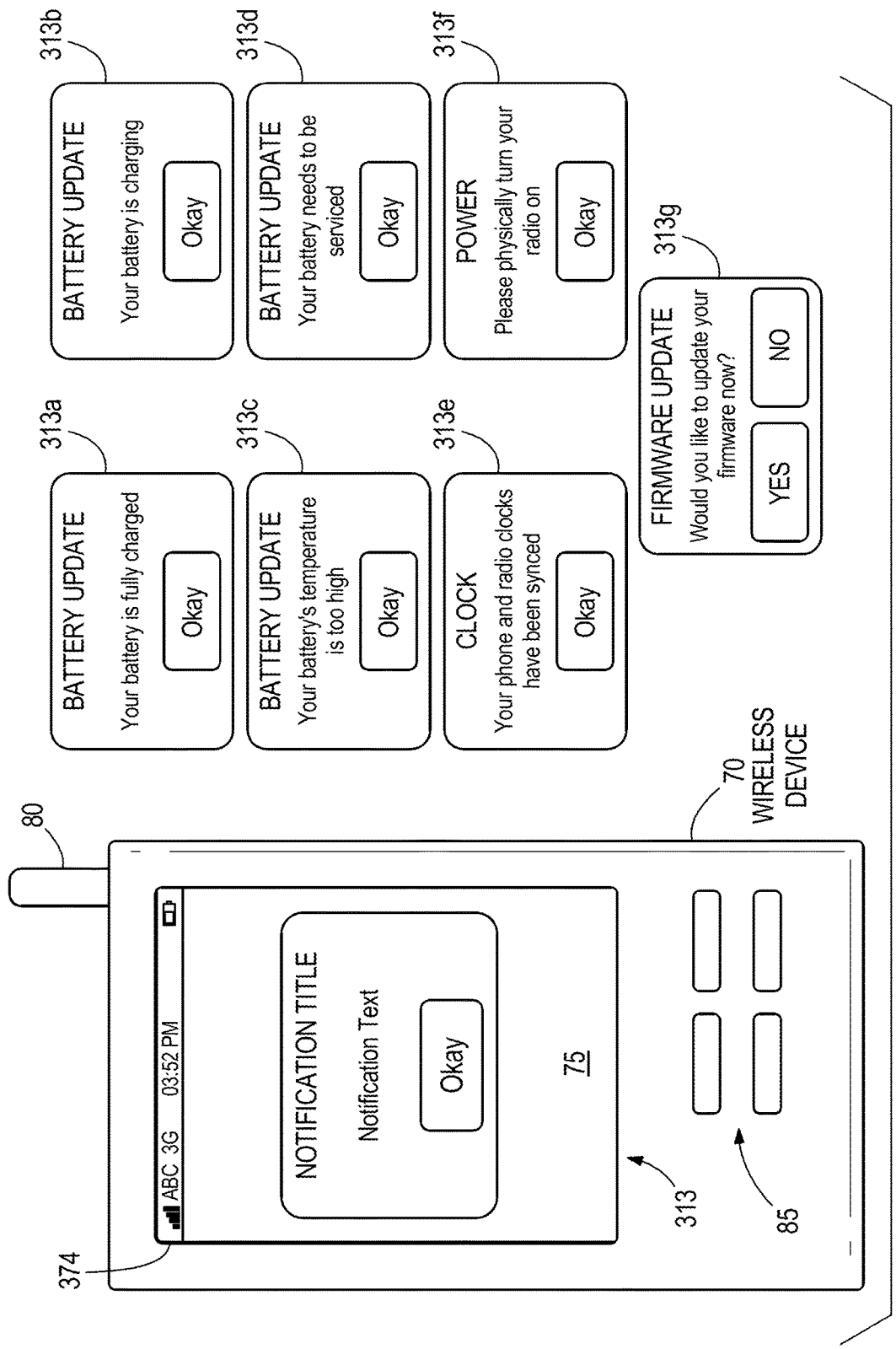

In step 312, the wireless device 70 determines whether the data received from the audio device 100 includes a notification. The controller 155 analyzes data from the battery monitoring module 170, charger 165, and other components of the audio device, and determines if a notification should be generated. For example, the controller 155 is operable to compare the battery temperature measured by the battery monitoring module 170 to predetermined thresholds to determine whether a high temperature threshold has been exceeded. If the wireless device 70 determines that a notification should be displayed in step 312, the wireless device proceeds to step 314 and displays the notification. The controller 155 is also operable to detect other characteristics of the audio device 100, such as whether it is coupled to the AC source 180, whether a malfunction has occurred on a component of the audio device 100, and whether a device has been coupled to or disconnected from the data port 172 and auxiliary in 174. A generic notifications screen 313 along with various notifications 313*a-f* are illustrated in FIG. 4B including: battery charged (313*a*), battery is charging (313*b*), battery temperature is too high (313*c*), battery requires service (313*d*), clocks of the audio device 100 and wireless device have been synchronized (313*e*), power of audio device is off (313*f*), and out-of-date firmware version (313*g*). Other potential notifications includes battery is low, battery temperature has returned to normal, error on audio device 100, firmware has been updated, audio source removed (e.g., if device supplying audio stream to audio circuit via data port 172 or aux-in 174 is removed).

In some instances, the wireless device 70 analyzes the data received in step 310 and determines whether the data merits a notification in step 312. In other words, data collected by the controller 155, including battery temperature, charge level, etc., is provided to the wireless device 70. Thereafter, the wireless device 70 determines whether a battery low charge condition exists, a battery high temperature exists and, in turn, displays appropriate notifications. The wireless device 70 may obtain the various thresholds applicable to the particular audio device 100 and battery 190 from a remote server, or from the devices themselves. In some embodiments, the audio device 100 and the wireless device 70 share efforts for determining whether notifications should be generated and displayed.

Figure 4G:
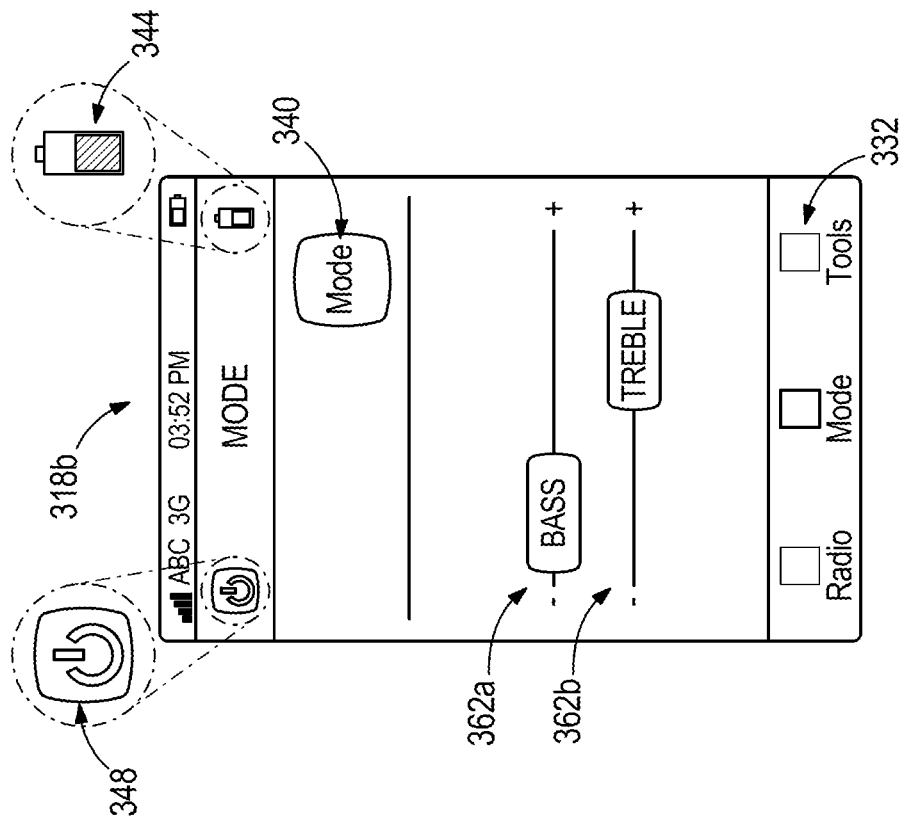
Figure 4F:
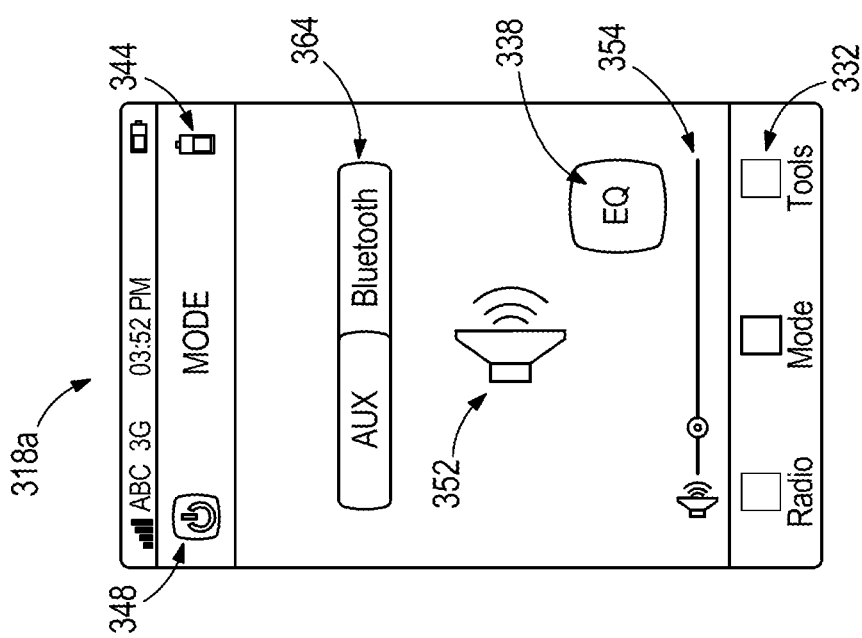
Figure 6:
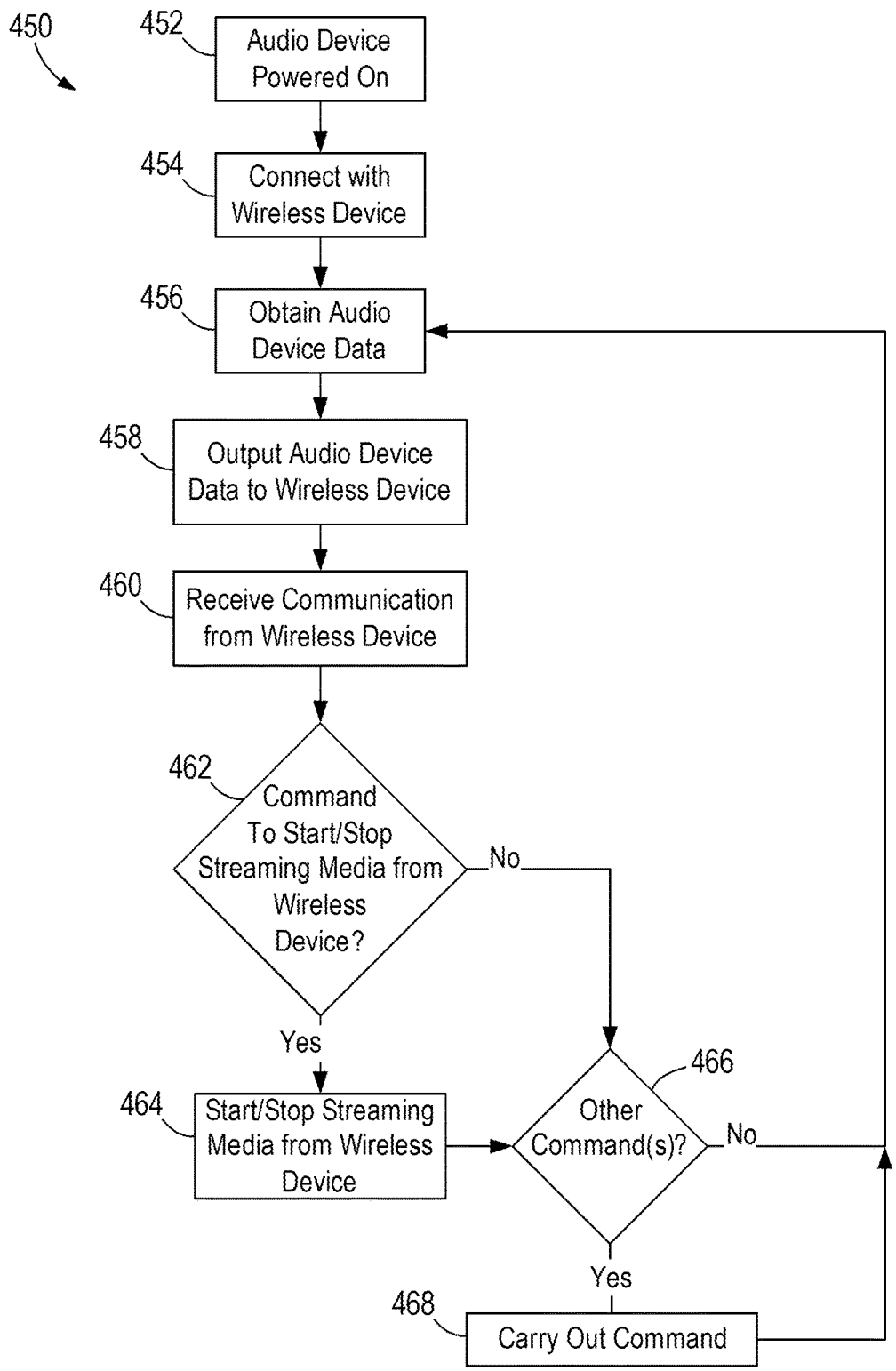
FIG. 6 illustrates a wireless communication method for wireless device and audio device.

After the notifications are displayed in step 314, or if no notifications are to be displayed as determined in step 312, the wireless device 70 proceeds to display a selection screen for selecting one of the radio screen (e.g., radio screen 316*a* of FIG. 4C), the mode screen (e.g., mode screen 318*a* FIG. 4F), or the tools screen (e.g., tools screen 320 FIG. 4H). The wireless device 70 determines which screen to display in step 322, and proceeds to display the selected screen in one of step 324, 326, and 328. The radio screen 316, mode screen 318, and tool screen 320 may include sub-screens that the user can switch between. For instance, FIGS. 4C-E illustrate radio screens 316*a*, 316*b*, and 316*c*, and FIGS. 4F-G illustrate mode screens 318*a* and 318*b*. One of each of the screens may be pre-selected as default (home) screens, such as radio screen 316*a* and mode screen 318*a*, such that, for example, when the user selects the radio screen, radio screen 316*a* is displayed. In some instances, the wireless device 70 defaults to one of the three screens, such as the radio screen 316*a*, or the user has otherwise indicated a screen selection (e.g., via step 330), and the selection step 322 is bypassed.

In step 330, the wireless device 70 detects whether a user selected a screen change. For instance, screens 316*a-c*, 318*a-b*, and 320 each include a screen select tray 332 allowing a user to select one of the radio screen 316, mode screen 318, and tools screen 320. Additionally, within the radio screens 316, a user may select a different radio screen 316*a*, 316*b*, or 316*c*. For example, when the radio screen 316*a* is displayed, the user may select the presets button 333 to switch to the radio screen 316*b* and select the equalizer button 334 to switch to the radio screen 316*c*. Similarly, in the radio screen 316*b*, the user may select the radio button 336 to return to the radio screen 316*a*; in the mode screen 318*a*, the user may select the equalizer button 338 to switch to the mode screen 318*b*; in the mode screen 318*b*, the user may select the mode button 340 to return to the mode screen 318*a*.

When the wireless device 70 determines that the user selected a new screen in step 330, the software application returns to step 322 and proceeds to display the newly selected screen in step 324, 326, or 328, as appropriate.

If the user did not select a screen change, the wireless device 70 proceeds to step 342 to determine whether the user provided other input. If no user input was provided, the wireless device 70 returns to step 310 to again receive data from the audio device 100. Accordingly, steps 310-342 repeat and data from the audio device 100 is periodically received in step 310 until a notification is to be displayed (steps 312 and 314), a screen change is selected (step 330), or other user input is received (step 342). The display 75 may be updated based on data received from the audio device 100 without causing a notification to be displayed in steps 312 and 314. For example, a battery level 344 shown on radio screen 316*a* is updated to reflect the current battery charge level. In some instances, the battery level 344 displayed on the wireless device 70 mimics a similar battery indicator shown on the audio device 100, such as on the user interface 115. Accordingly, the user has a consistent battery indicator on both devices. Additionally, if the radio station is changed on the audio device 100 via the user interface 115, the displayed radio station on tuner 346 of the radio screen 316a is updated to reflect the new radio station.

The user is also able to input commands on the touch screen display 75, which the wireless device 70 provides to the audio device 100 via the wireless interfaces 200. For instance, on each of the screens 316, 318, and 320, the user is able to power off the audio device 100 via power toggle 348. If the audio device 100 is turned off and the user selects the power toggle 348, the notification 313f of FIG. 4B is shown on display 75.

On the radio screen 316a (FIG. 4C), the user is able to adjust the radio station by swiping a finger across the tuner 346. For instance, swiping right on the tuner 346 will increase the radio station frequency current tuned-into on the audio device 100, while swiping left on the tuner 346 will decrease the radio station frequency. The user is also able to switch between AM and FM stations via band toggle 350, mute or unmute the audio device 100 via mute toggle 352, and to adjust the volume with a volume control 354.

Turning to radio screen 316b (FIG. 4D), the user is operable to select or adjust preset radio stations of the audio device 100. To select a preset station, the user selects one of the ten preset buttons 356 that includes a radio frequency (e.g., 356a). To set a preset station, the user selects any of the ten preset buttons 356, selects a radio station with the tuner 358, and toggles the set button 360. On the radio screen 316c (FIG. 4E) and mode screen 318b (FIG. 4G), the user is able to adjust the base and treble of the audio device 100 via base slider 362a and treble slider 362b, respectively.

On the mode screen 318a (FIG. 4F), the user is able to choose the audio source for the audio device 100 to be one of the auxiliary input 174 ("AUX" button) and streamed audio from the wireless device 70 ("Bluetooth" button) using source selector 364. In some instances, the source selector 364 includes additional options, such as "radio," which would cause the audio device 100 to be in the radio mode and may return the user to radio screen 316a, and "USB® device," which would cause the audio device 100 to stream media from a device coupled to the data port 172.

On the tools screen 320, the user may sync the radio clock using sync toggle 366, which causes the wireless device 70 to send the current time to the audio device 100. The audio device 100 may return a notification indicating that the synchronization is complete, which is displayed as notification 313e (FIG. 4B). The user is also able to enable and disable particular notifications using toggles 368 and to enable and disable firmware update checks using toggle 370.

After a user inputs a command on one of the screens 316, 318, and 320, as detected in step 342, the wireless device 70 communicates the command(s) to the audio device 100 in step 372 via the wireless interfaces 200.

The wireless device 70 is also able to provide firmware updates to the audio device 100. As noted, the audio device 100 is operable to provide its firmware version to the wireless device 70, which may include a firmware version number, such as "2.1." The wireless device 70 is operable to obtain from a remote device, such as a remote server, the most recent firmware version for the particular audio device 100 (e.g., "3.0"). In step 312, the wireless device 70 compares the firmware version supplied by the audio device 100 with the most recent firmware version, and determines whether the audio device 100 has out-of-date firmware. In the case of out-of-date firmware, the wireless device 70 displays the notification 313f in step 314. The user is then able to choose whether to perform a firmware update on the audio device 100. If the user opts to update the firmware, the wireless device 70 retrieves a firmware update, which may be on a remote server or may have been previously loaded onto the wireless device 70. Then, the wireless device 70 wirelessly transmits the firmware update to the audio device 100. The audio device 100 then updates its firmware using the firmware update supplied by the wireless device 70.

Various screens of the display 75 further include a status bar 374 for the wireless device (see screen 313 of FIG. 4B). The status bar 374 indicates a current cellular network strength, cellular network name, cellular data network type, current time, and strength of battery of the wireless device 70. Other information may also be included on the status bar 374, such as current date.

FIG. 5 illustrates an alternate graphical user interface (GUI) 400 for the wireless device 70. The GUI 400 includes, the power toggle 348, the mute toggle 352, the volume control 354, the status bar 374, a media playlist button 402, media player controls 404, and navigation controls 406. The media playlist button 402, when selected, causes a screen to be shown on display 75 that lists a current playlist of the audio device 100, which may be stored locally on the wireless device 70 or which may have been transferred from the audio device 100 or a device coupled thereto via the audio compartment 130. The media player controls 404 enable a user to alter the media playback of the audio device 100 or the media playback being streamed to the audio device 100 by the wireless device 70.

A method 450 of operation of the audio device 100 and wireless device 70, from the perspective of the audio device 100, is illustrated in FIG. 3. In step 452, the audio device 100 is powered on. For instance, the audio device 100 receives power from one of the AC source 180 and the battery 190. In step 454, a wireless connection is established with the wireless device 70 via the wireless interfaces 200. In step 456, the audio device 100 obtains audio device data, such as battery data (e.g., state of charge and/or temperature), radio data (e.g., preset stations, current station and band, current bass, treble, and other equalizer settings, volume data, etc.) firmware version, and/or clock information (e.g., current time and date stored on the audio device 100). In step 458, the obtained data is output to the wireless device 70. In step 460, the audio device 100 receives communication from the wireless device 70.

The audio device 100 interprets the communications to determine whether any commands are present. If a command is received to start or stop streaming media (e.g., audio) from the wireless device 70, the audio device 100 proceeds to step 464. In step 464, the audio device 100 starts or stops, depending on the received command, media from the wireless device 70. The audio device 100 determines whether other commands are present in step 466. If other command types are present, in step 468, the audio device 100 carries out the received commands, such as change the audio source, change the radio station, power down, alter volume, update firmware, etc. Thereafter, or if no other commands were received, the audio device 100 returns to step 456, unless a received command indicates to power down. In the case of a power down command, the audio device 100 will shut off and method 450 ends. Upon another power up of the audio device 100, method 450 begins again at step 452.

Although the methods 300 and 450 are described as being carried out in a particular order, one or more of the steps of the methods 300 and 450, respectively, may be carried out in a different order or simultaneously with other steps.

Figure 7A:
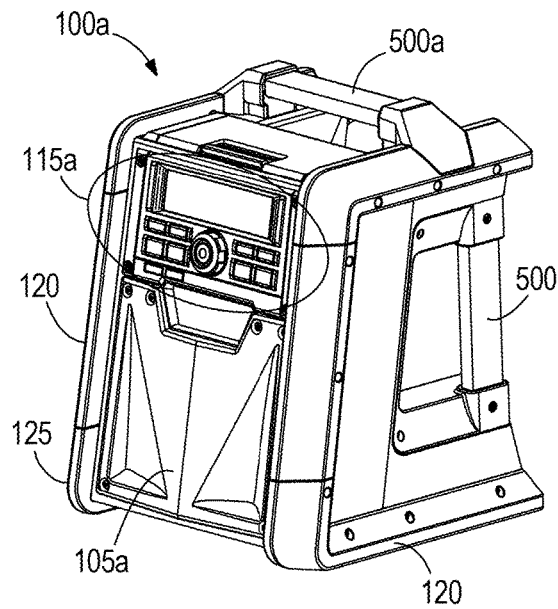
FIGS. 7A-H illustrate another embodiment of the audio device with wireless communication capabilities according to embodiments of the invention.
Figure 7B:
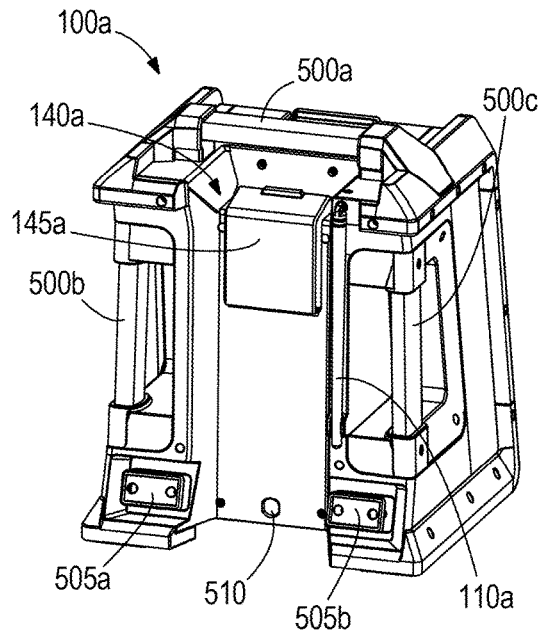
Figure 7C:
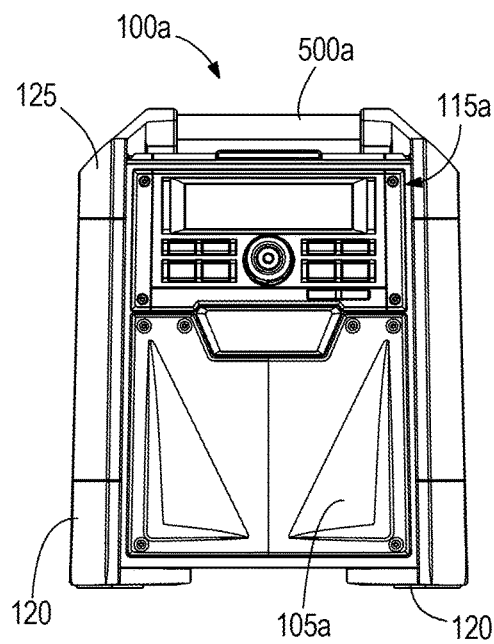

FIGS. 7A-H illustrate another embodiment of the audio device 100, labeled 100a. FIGS. 7A-B illustrate perspective views of the audio device 100a; FIGS. 7C, 7D, 7E, 7F, and 7G illustrate a front, back, top, left, and right view, respectively, of the audio device 100a. Components of audio device 100a that are similar to those of audio device 100 are numbered similarly, but include an appended "a." For instance, the speaker(s) of the audio device 100a are labeled 105a, similar to the speakers 105 of the audio device 100. Unless otherwise noted, the audio device 100a functions similarly to the audio device 100 and includes similar internal circuitry, such as that shown and described with respect to FIG. 2.

Although the audio device 100a is shown as having a solid cover over the one or more speakers 105a, in some embodiments, the speaker cover is a rigid mesh cover similar to that covering the speakers 105 of the audio device 100.

Figure 7D:
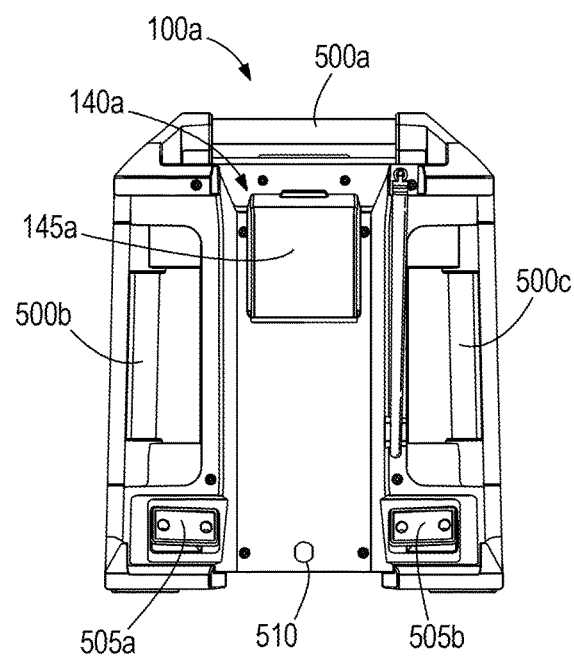
Figures 7F, 7G:
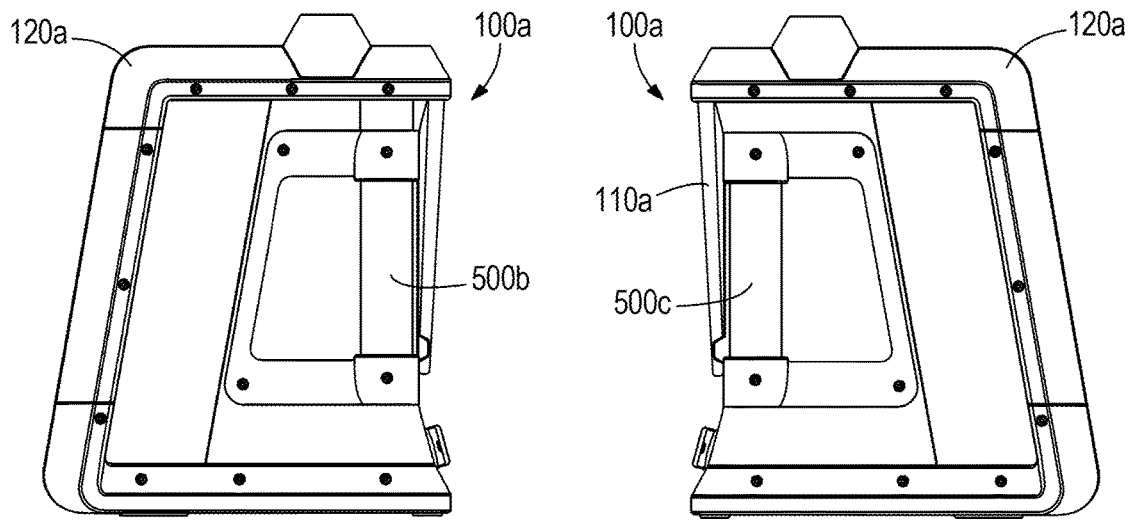
Figure 7E:
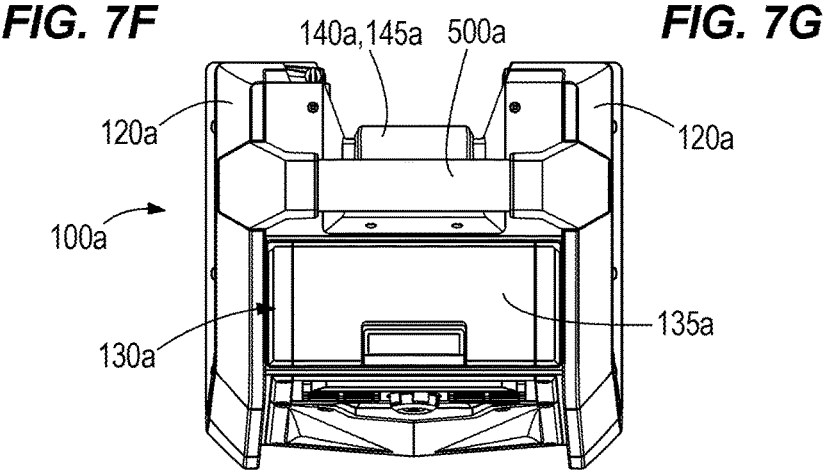

The audio device 100a includes three handles 500a, 500b, and 500c, rigidly coupled to the housing 125a. Additionally, the audio device includes two cord wrap tabs 505a and 505b extending from the back of the guard structures 120a, as shown in FIGS. 7B and 7D. When not in use, a cord for coupling the audio device 100a to an AC outlet may be wrapped around the cord wrap tabs 505a and 505b for convenient storage. The cord, not shown, may be selectively coupled to the audio device 100a via a connector 510. The audio device 100a further includes a door 135a covering an audio compartment 130a on the top side of the audio device 100a, as shown in FIG. 7E. Similar to the audio compartment 130, the audio compartment 130a includes an auxiliary input and data port (e.g., a USB® port) and provides a space for receiving an external device such as a smart phone or digital audio player. The door 135a and audio compartment 130a provide a protected area for such an external device.

The audio device 100a further includes a battery receptacle 140a covered by a door 145a. The battery receptacle 140a is recessed below the top surface of the audio device 100a and in from the back surface of the audio device 100a. The recessed nature of the battery receptacle 140a provides further protection for an inserted battery 190 and the door 145a.

Figure 7H:
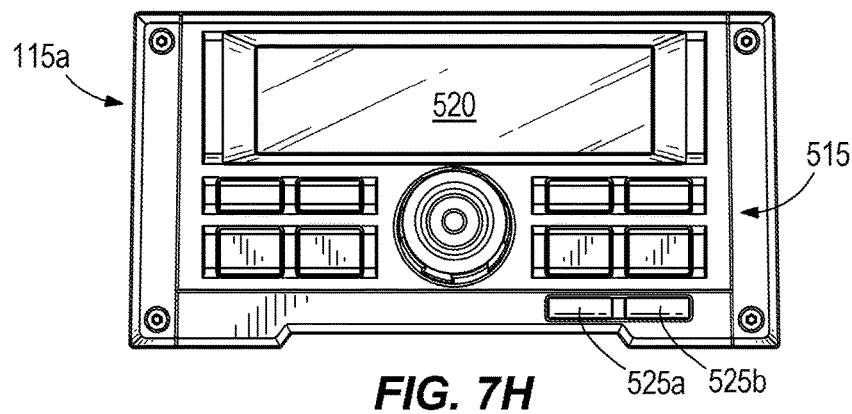

FIG. 7H illustrates the user interface 115a in greater detail. Similar to the user interface 115, the user interface 115a includes actuators 515 for receiving user input to control the audio device 105a and a display 520 for providing user feedback. The user interface 115a also includes battery indicators 525a and 525b, which are red and green light emitting diodes (LEDs), respectively. The battery indicator 525a is illuminated red when the battery 190 in the compartment 140a is being charged, and the battery indicator 525b is illuminated green when the battery 190 is fully charged. The battery indicators 525a and 525b further include various flashing patterns to convey other battery information, such as overheating, low battery, battery malfunction, etc. In some embodiments, battery information may also be shown on the display 520 instead of or in addition to the battery indicators 525a and 525b.

Thus, the invention provides, among other things, systems and methods having a wireless device in communication with, controlling, and providing streaming media to a worksite audio device. Various features and advantages of the invention are set forth in the following claims.

What is claimed is:

1. A worksite audio device comprising:
    a battery receptacle that receives a power tool battery pack;
    a battery charging circuit that charges the power tool battery pack in the battery receptacle;
    an audio circuit coupled to a speaker and that provides an audio signal to the speaker, wherein the speaker outputs audio corresponding to the provided audio signals;
    a battery monitoring module that determines a status of the power tool battery pack in the battery receptacle, wherein the battery monitoring module is located within a housing of the worksite audio device and outside of the power tool battery pack;
    a wireless interface that wirelessly communicates with an external device having a display; and
    a controller coupled to the battery monitoring module and the wireless interface and located within the housing of the worksite audio device and outside of the power tool battery pack, wherein the controller
        receives the status of the power tool battery pack from the battery monitoring module,
        outputs, via the wireless interface, the status of the power tool battery pack to the external device for display,
        determines a status of the worksite audio device, and
        outputs, via the wireless interface, the status of the worksite audio device to the external device for display, wherein the status of the worksite audio device indicates at least one selected from the group consisting of a volume setting, a radio station frequency, a mute function status, and a current audio source.

2. The worksite audio device of claim 1, wherein the status of the power tool battery pack indicates a state of charge of the power tool battery pack.

3. The worksite audio device of claim 1, wherein the status of the power tool battery pack indicates a temperature of the power tool battery pack.

4. The worksite audio device of claim 1, wherein the status of the power tool battery pack indicates that the power tool battery pack is being charged.

5. The worksite audio device of claim 1,
    wherein the battery monitoring module detects that the power tool battery pack has reached a full charge, and
    wherein the status of the power tool battery pack indicates that the power tool battery pack has reached full charge in response to the detection.

6. The worksite audio device of claim 1, wherein the controller further
    receives an instruction from the external device, via the wireless interface, for the worksite audio device, and
    controls the worksite audio device in accordance with the instruction.

7. The worksite audio device of claim 1, wherein
    the controller receives an audio stream from the external device; and
    the audio circuit outputs the audio stream as audio signals to the speaker.

8. The worksite audio device of claim 1, further comprising firmware, wherein the controller
    outputs an indication of a version of the firmware to the external device;
    receives an update to the firmware, based on the indication of the version, from the external device; and
    updates the firmware with the received update.

9. The worksite audio device of claim 1, further comprising at least two guard structures outside of the housing of the worksite audio device.

10. A worksite audio device control system comprising:
    a worksite audio device including
        a battery receptacle that receives a power tool battery pack;

a battery charging circuit that charges the power tool battery pack in the battery receptacle;

an audio circuit coupled to a speaker and that provides audio signals to the speaker, wherein the speaker outputs audio corresponding to the provided audio signals;

a battery monitoring module that determines a status of the power tool battery pack in the battery receptacle, wherein the battery monitoring module is located outside of the power tool battery pack;

a first wireless interface; and a controller coupled to the battery monitoring module and the first wireless interface and located within a housing of the worksite audio device and outside of the power tool battery pack, wherein the controller receives the status of the power tool battery pack from the battery monitoring module, outputs, via the first wireless interface, the status of the power tool battery pack;

determines a status of the worksite audio device, and outputs, via the first wireless interface, the status of the worksite audio device to a mobile phone for display; and the mobile phone including:

a second wireless interface;

a display; and a phone controller coupled to the second wireless interface and the display, wherein the phone controller receives the status of the power tool battery pack and the status of the worksite audio device from the controller of the worksite audio device via the second wireless interface, and causes the status of the power tool battery pack and the status of the worksite audio device to be shown on the display.

11. The worksite audio device control system of claim 10, wherein the status of the power tool battery pack indicates at least one selected from the group consisting of a state of charge of the battery, a temperature of the battery, and that the battery is being charged.

12. The worksite audio device control system of claim 10, wherein the battery monitoring module initially detects that the power tool battery pack is being charged, and then detects that the power tool battery pack has reached a full charge, and wherein the status of the power tool battery pack indicates that the power tool battery pack has reached full charge in response to the detection.

13. The worksite audio device control system of claim 10, wherein the phone controller outputs an instruction, via the second wireless interface, to the controller of the worksite audio device; and the controller of the worksite audio device controls the worksite audio device in accordance with the instruction.

14. The worksite audio device control system of claim 10, wherein the status of the worksite audio device indicates at least one selected from the group consisting of a volume setting, a radio station frequency, a mute function status, and a current audio source.

15. The worksite audio device control system of claim 10, wherein the phone controller outputs an audio stream, via the second wireless interface, to the controller of the worksite audio device; and the audio circuit of the worksite audio device outputs the audio stream as audio signals to the speaker.

16. The worksite audio device control system of claim 10, further comprising firmware, wherein the controller outputs an indication of a version of the firmware to the mobile phone;

the phone controller determines whether an update to the firmware is available based on the received version;

the phone controller outputs the update to the worksite audio device;

the controller of the worksite audio device updates the firmware with the received update.

17. The worksite audio device control system of claim 10, further comprising at least two guard structures outside of the housing of the worksite audio device.

18. A method of wirelessly communicating by a worksite audio device, the worksite audio device including a battery receptacle that receives a power tool battery pack, a battery charging circuit that charges the power tool battery pack in the battery receptacle, an audio circuit coupled to a speaker, a battery monitoring module that determines a status of the power tool battery pack in the battery receptacle, a wireless interface that wirelessly communicates with an external device having a display; and a controller coupled to the battery monitoring module and the wireless interface and located outside of the power tool battery pack, the method comprising:

establishing a wireless connection, via the wireless interface, with the external device;

generating, by the display of the external device, a graphical user interface including a screen selection tray;

receiving, by the display, a screen selection in the screen selection tray, the screen selection indicating selection of at least one selected from the group consisting of a radio screen, a mode screen, and a tools screen, displaying the at least one selected from the group consisting of the radio screen, the mode screen, and the tools screen on the display of the external device based on the screen selection, wherein the radio screen includes at least one of the group consisting of a radio station and a volume level of the worksite audio device, the mode screen includes an audio source for the worksite audio device, and the tools screen includes toggles that control notifications provided by the worksite audio device to the external device;

obtaining the status of the power tool battery pack from the battery monitoring module, the battery monitoring module being located within a housing of the worksite audio device and outside of the power tool battery pack;

outputting the status of the power tool battery pack, via the wireless interface, to the external device;

receiving, from the external device, a command via the wireless interface;

controlling the worksite audio device in accordance with the command, wherein the command causes the worksite audio device to at least one selected from the group consisting of adjust a volume setting, adjust a radio station frequency, toggle a mute function, and switch an audio source;

obtaining a status of the worksite audio device; and outputting, via the wireless interface, the status of the worksite audio device to the external device, wherein the status of the worksite audio device indicates at least one selected from the group consisting of a volume setting, a radio station frequency, a mute function status, and a current audio source.

19. The method of claim 18, further comprising displaying, on the external device, the status of the power tool battery pack.

20. The method of claim 18, further comprising:
receiving, from the external device, an audio stream; and
outputting the audio stream via the audio circuit and speaker.

21. The method of claim 18, further comprising:
receiving, from the external device, a firmware update; and
updating firmware of the worksite audio device with the firmware update.

22. The method of claim 18, wherein the status of the power tool battery pack indicates at least one selected from the group consisting of a state of charge of the power tool battery pack, a temperature of the power tool battery pack, and that the power tool battery pack is being charged.

23. The worksite audio device of claim 1, wherein the battery receptacle is housed inside a battery compartment, the battery compartment covered by a door, the door secured by a latching mechanism.

24. The worksite audio device of claim 1, further comprising an audio compartment covered by a latching door.

* * * * *